United States Patent
Song et al.

(10) Patent No.: US 8,130,848 B2
(45) Date of Patent: Mar. 6, 2012

(54) CHANNEL ESTIMATION FOR OFDM-BASED WIRELESS COMMUNICATION SYSTEM USING SPARSELY SPACED PILOT SUBCARRIERS

(75) Inventors: Kee-Bong Song, Santa Clara, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 950 days.

(21) Appl. No.: 12/113,918

(22) Filed: May 1, 2008

(65) Prior Publication Data

US 2008/0273583 A1 Nov. 6, 2008

Related U.S. Application Data

(60) Provisional application No. 60/927,498, filed on May 4, 2007.

(51) Int. Cl.
*H04K 1/10* (2006.01)
(52) U.S. Cl. ........ 375/260; 375/259; 375/343; 375/142; 375/150; 375/340; 370/470; 370/471; 370/473; 370/509; 455/137; 455/231; 455/303
(58) Field of Classification Search .................. 375/260, 375/259, 343, 142, 150, 340; 370/470, 471, 370/473, 509; 455/137, 231, 303
See application file for complete search history.

(56) References Cited

U.S. PATENT DOCUMENTS

| | | | |
|---|---|---|---|
| 6,996,195 B2 * | 2/2006 | Kadous | 375/341 |
| 2001/0036235 A1 | 11/2001 | Kadous | |
| 2002/0191630 A1 * | 12/2002 | Jacobsen | 370/430 |
| 2003/0103445 A1 | 6/2003 | Steer et al. | |
| 2006/0280114 A1 | 12/2006 | Osseiran et al. | |
| 2007/0036069 A1 | 2/2007 | Wu et al. | |
| 2007/0053282 A1 | 3/2007 | Tong et al. | |
| 2008/0108310 A1 * | 5/2008 | Tong et al. | 455/69 |

* cited by examiner

*Primary Examiner* — David C. Payne
*Assistant Examiner* — Zewdu Kassa
(74) *Attorney, Agent, or Firm* — Thomas H. Ham; Wilson Ham & Holman (57) ABSTRACT

A device and method for performing a channel estimation for an OFDM-based wireless communication system using sparsely spaced pilot subcarriers estimates missing pilot subcarriers in an interpolation window using pilot subcarriers that are outside of the interpolation window to produce estimated pilot subcarriers for the interpolation window. The pilot subcarriers in the interpolation window and the estimated pilot subcarrier are used to compute pilot channel estimates for the interpolation window, which are then used to derive data channel estimates for the interpolation window.

14 Claims, 6 Drawing Sheets

CHANNEL ESTIMATION FOR OFDM-BASED WIRELESS COMMUNICATION SYSTEM USING SPARSELY SPACED PILOT SUBCARRIERS

CROSS REFERENCE TO RELATED APPLICATION

This application claims benefit of U.S. Provisional Patent Application Ser. No. 60/927,498, filed on May 4, 2007, which is incorporated herein by reference.

BACKGROUND OF THE INVENTION

Orthogonal frequency division multiplexing (OFDM) is a method of multi-carrier digital communication where wideband information data is distributed across many narrowband "subcarriers" in the frequency domain. Because each individual subcarrier is a narrowband sinusoidal wave, it can be transmitted with less distortion caused by inter-symbol-interference over multipath wireless fading environment. The original information can be recovered at the receiver without a complex equalization process, and is robust in a multipath propagation environment.

Orthogonal frequency division multiple access (OFDMA) is a method of multi-user digital communications, wherein each user utilizes an allotment of the available sub-carriers for their individual communication. The fundamental operation and advantages of OFDMA systems is similar to that of OFDM systems in multipath wireless propagation environment. So the terms OFDM and OFDMA are used here interchangeably.

An accurate channel estimation in an OFDM receiver is important for the recovery of the transmitted information data at the receiver. If the receiver makes a significant error in its channel estimation, the original modulation symbol can be decoded in error because each subcarrier in the OFDM symbol is multiplied by fading coefficients that have different amplitudes and phases. This is especially true for higher-order 16-QAM and 64-QAM modulation, which are widely used to transmit high data rate signals.

One method of estimating the channel response in the frequency domain is to measure the received pilot subcarriers. In each transmitted OFDM symbol, known pilots are inserted at known subcarrier locations. This helps later to estimate the channel values in those subcarrier locations. The channel values in other subcarrier locations can then be interpolated from the channel estimates for the received pilot subcarriers. Conventional interpolation methods include least square, linear, cubic and polynomial interpolation schemes.

Some communication systems do not evenly space the pilot subcarriers in every OFDM symbol, and the pilot subcarriers can be sparsely distributed across multiple OFDM symbols. However, these kinds of pilot patterns are usually repeated after several symbols.

One such example is a multi-input multi-output (MIMO) wireless communication system where multiple transmit and receive antennas are deployed between the communication links in order to increase the data rate and quality of service (QoS). In MIMO systems, the pilot subcarriers are often orthogonally partitioned between different transmit antennas to help the receiver track and estimate the different channel responses from each of the many transmit antennas, which results in sparsely spaced pilot subcarriers for every OFDM symbol. Another reason to use sparse pilot spacing across multiple symbols is to reduce the pilot overhead. Using fewer pilots reduces overhead, and so lesser transmit power can be used with less interference to other users.

Thus, there is a need for a device and method for minimizing channel estimation errors in OFDM-based wireless communication systems that use sparsely populated pilots.

SUMMARY OF THE INVENTION

A device and method for performing a channel estimation for an OFDM-based wireless communication system using sparsely spaced pilot subcarriers estimates missing pilot subcarriers in an interpolation window using pilot subcarriers that are outside of the interpolation window to produce estimated pilot subcarriers for the interpolation window. The pilot subcarriers in the interpolation window and the estimated pilot subcarrier are used to compute pilot channel estimates for the interpolation window, which are then used to derive data channel estimates for the interpolation window.

A method for performing a channel estimation for an OFDM-based wireless communication system with sparsely spaced pilot subcarriers in accordance with an embodiment of the invention comprises (a) receiving an OFDM-based signal including data and pilot subcarriers, (b) collecting the pilot subcarriers of the OFDM-based signal, including the pilot subcarriers of the OFDM-based signal in an interpolation window, the interpolation window being defined as at least one OFDM-based symbol index in the time domain where same channel estimates will be used and a set of pilot and data subcarrier location indexes in the frequency domain, (c) estimating at least some pilot subcarriers in the interpolation window using some of the pilot subcarriers that are outside of the interpolation window to produce estimated pilot subcarriers of the interpolation window, (d) computing pilot channel estimates at the pilot subcarrier locations in the interpolation window using the pilot subcarriers in the interpolation window and the estimated pilot subcarriers, and (e) interpolating the pilot channel estimates to derive data channel estimates at data subcarrier locations for the data subcarriers in the interpolation window.

A method for performing a channel estimation for an OFDM-based wireless communication system with sparsely spaced pilot subcarriers in accordance with an embodiment of the invention comprises (a) receiving an OFDM-based signal including data and pilot subcarriers, (b) collecting the pilot subcarriers of the OFDM-based signal across multiple subcarrier location indexes and across multiple OFDM-based symbol indexes, including the pilot subcarriers of the OFDM-based signal in an interpolation window, the interpolation window being defined as a set of OFDM-based symbol indexes in the time domain where same channel estimates will be used and a set of pilot and data subcarrier location indexes in the frequency domain, (c) estimating at least some missing pilot subcarriers at pilot subcarrier locations in the interpolation window using some of the pilot subcarriers at the pilot subcarrier locations that are outside of the interpolation window to produce estimated pilot subcarriers of the interpolation window, (d) computing pilot channel estimates at the pilot subcarrier locations in the interpolation window using the pilot subcarriers in the interpolation window and the estimated pilot subcarriers, and (e) interpolating the pilot channel estimates to derive data channel estimates at data subcarrier locations for the data subcarriers in the interpolation window.

A channel estimation device for an OFDM-based wireless communication system with sparsely spaced pilot subcarriers in accordance with an embodiment of the invention comprises a pilot subcarrier collector, a pilot subcarrier estimator, a pilot channel estimator and an interpolator. The pilot subcarrier collector is configured to collect pilot subcarriers of the OFDM-based signal, including the pilot subcarriers of the OFDM-based signal in an interpolation window. The interpolation window is defined as at least one OFDM-based symbol index in the time domain where same channel estimates will be used and a set of pilot and data subcarrier location indexes in the frequency domain. The pilot subcarrier estimator is operably connected to the pilot subcarrier collector. The pilot subcarrier estimator is configured to estimate at least some pilot subcarriers in the interpolation window using some of the pilot subcarriers that are outside of the interpolation window to produce estimated pilot subcarriers of the interpolation window. The pilot channel estimator is operably connected to the pilot subcarrier estimator. The pilot channel estimator is configured to compute pilot channel estimates at the pilot subcarrier locations in the interpolation window using the pilot subcarriers in the interpolation window and the estimated pilot subcarriers. The interpolator is operably connected to the pilot channel estimator. The interpolator is configured to interpolate the pilot channel estimates to derive data channel estimates at data subcarrier locations for the data subcarriers in the interpolation window.

Other aspects and advantages of the present invention will become apparent from the following detailed description, taken in conjunction with the accompanying drawings, illustrated by way of example of the principles of the invention.

DETAILED DESCRIPTION

Figure 1:
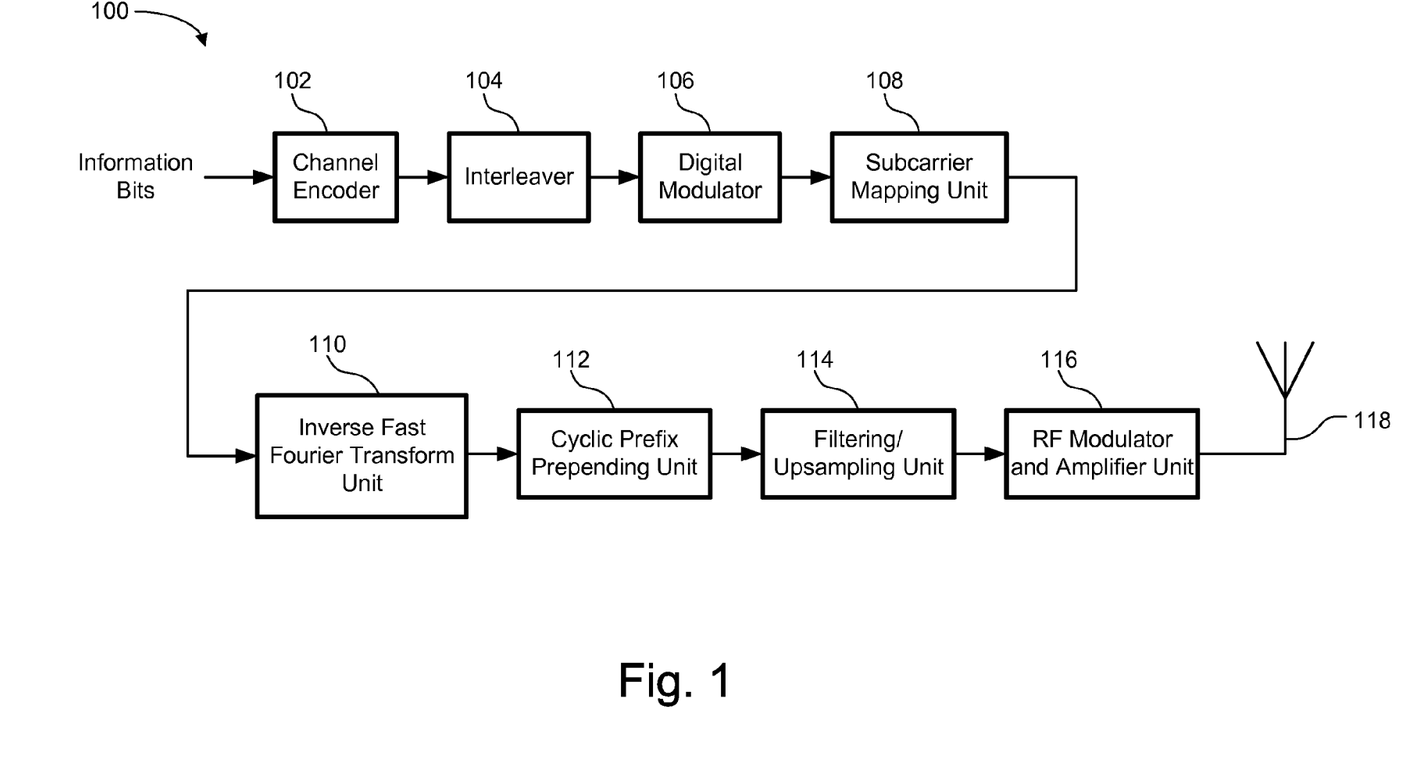
FIG. 1 is a block diagram of an Orthogonal Frequency Division Multiple Access (OFDMA) transmitter in accordance with an embodiment of the invention.

With reference to FIG. 1, an Orthogonal Frequency Division Multiple Access (OFDMA) transmitter 100 in accordance with an embodiment of the invention is described. The OFDMA transmitter 100 is part of an OFDMA wireless communication system. As an example, the OFDMA transmitter 100 may be a component of a base station of an OFDMA wireless communication system.

As shown in FIG. 1, the OFDMA transmitter 100 includes a channel encoder 102, an interleaver 104, a digital modulator 106, a subcarrier mapping unit 108, an inverse fast Fourier transform (IFFT) unit 110, a cyclic prefix prepending unit 112, a filtering/upsampling unit 114, a radio frequency (RF) modulator and amplifier unit 116, and a transmit antenna 118. The channel encoder 102 encodes information bits using convolutional coding, turbo coding, block coding or other well-known forward error correction (FEC) encoding schemes. The interleaver 104 interleaves the encoded bits to provide protection against burst errors that would otherwise occur due to deep channel fading. The digital modulator 106 maps the encoded and interleaved bits into modulation symbols of a quadrature phase shift keying (QPSK), M-ary quadrature amplitude modulation (M-QAM) or M-ary phase shift keying (M-PSK), or similar modulation scheme. The subcarrier mapping unit 108 maps the modulation symbols into data subcarriers in the frequency domain.

The number of data subcarriers available for each OFDMA symbol depends on the size of fast Fourier transform (FFT) that was selected, and the number of guard subcarriers and pilot subcarriers used. A group of N subcarriers, which includes data subcarriers, DC/guard subcarriers and pilot subcarriers, forms a single OFDMA symbol, where N is the FFT size.

Pilot subcarriers have known, fixed characteristics when they are transmitted. A matching receiver can therefore assume that any deviations they observe can be wholly attributed to the channel frequency response, and those differences can be used to compute a channel frequency response estimate. A pilot is strategically placed in each symbol index, at various subcarrier index locations. Sometimes the subcarrier index used for one symbol index can be the same one used for another's symbol index. An estimate of the overall channel frequency response is interpolated from the individual pilots.

The IFFT unit 110 uses IFFT to transform the N subcarriers into time-domain so that the OFDMA symbols will be suitable for sending through a wireless environment. For each OFDMA symbol, the cyclic prefix prepending unit 112 prepends the last M samples at the beginning of each symbol to generate cyclic prefix (CP). This CP serves as a guard period to eliminate the inter-symbol-interference (ISI) between OFDMA symbols in a multipath fading environment. The filtering/upsampling unit 114 filters and up-samples the CP-added OFDMA symbols for pulse shaping. The RF modulator and amplifier unit 116 converts the symbols to RF, and amplifies the signals for transmission via the transmit antenna 118 through a wireless environment. Although the OFDMA transmitter 100 is shown with a single transmit antenna, the OFDMA transmitter may include multiple antennas for multi-input multi-output (MIMO) communication.

Figure 2:
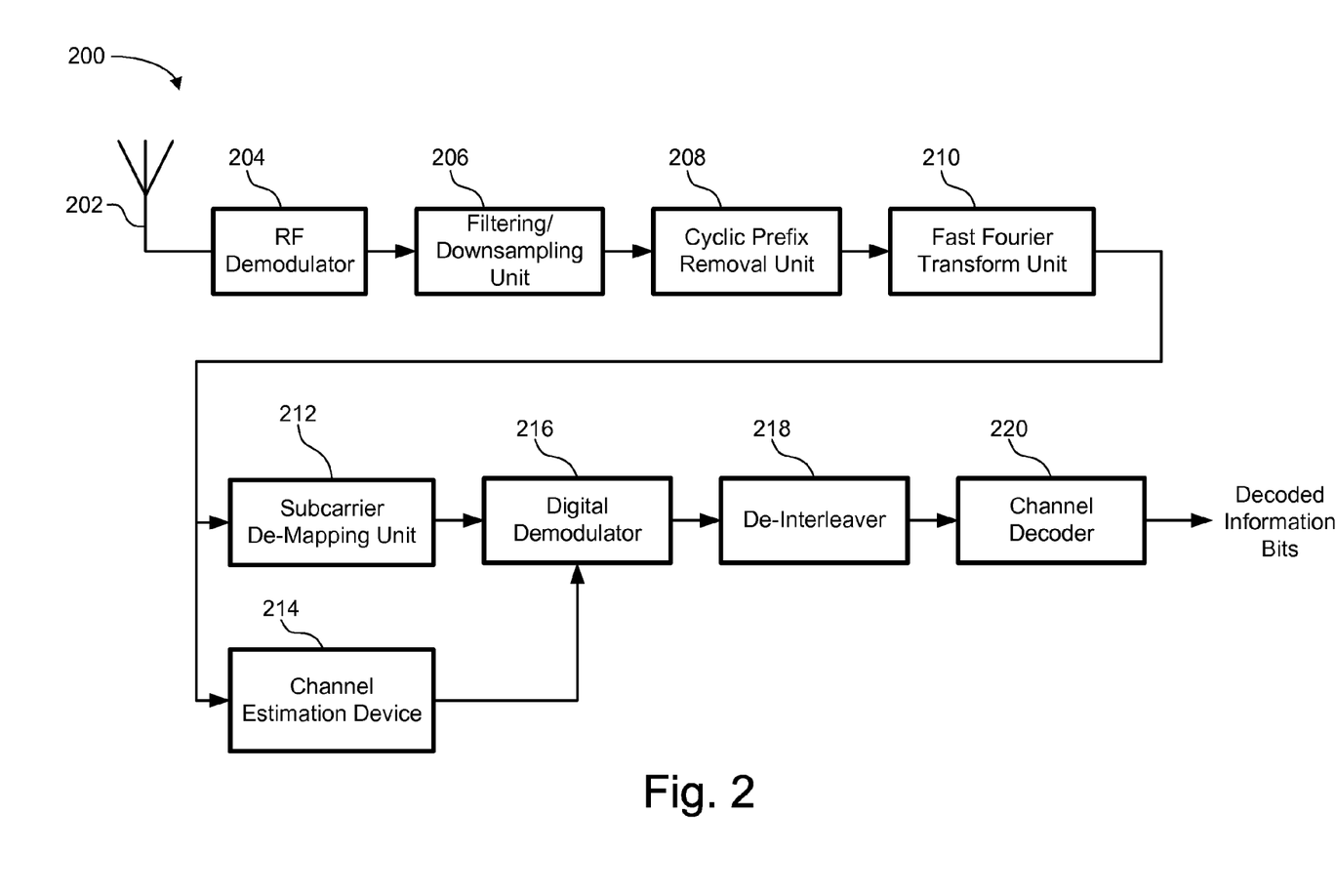
FIG. 2 is a block diagram of an OFDMA receiver in accordance with an embodiment of the invention.

Turning now to FIG. 2, an OFDMA receiver 200 in accordance with an embodiment of the invention is shown. The OFDMA receiver 200 is also part of an OFDMA wireless communication system. As an example, the OFDMA receiver 200 may be a component of a mobile station of an OFDMA wireless communication system.

As shown in FIG. 2, the OFDMA receiver 200 includes a receive antenna 202, an RF demodulator 204, a filtering/downsampling unit 206, a cyclic prefix removal unit 208, a fast Fourier transform (FFT) unit 210, a subcarrier de-mapping unit 212, a channel estimation device 214, a digital demodulator 216, a de-interleaver 218 and a channel decoder 220. The RF demodulator 204 is configured to demodulate the incoming RF signal received by the receive antenna 202. Although the OFDMA receiver 200 is shown with a single receive antenna, the OFDMA receiver may include multiple antennas for MIMO communication. The filtering/downsampling unit 206 filters and down converts the RF-demodulated signal to a baseband signal. The cyclic prefix removal unit 208 removes the samples for the CP portion of the received signal. The FFT unit 210 applies FFT on N received samples per OFDMA symbol to generate N received subcarriers per OFDMA symbol in the frequency domain.

The subcarrier de-mapping unit 212 de-maps the generated subcarriers to extract the subcarriers intended for this particular OFDMA receiver 200. The channel estimation device 214 computes frequency-domain channel estimates for the pilot subcarriers and then interpolates the pilot channel estimates to derive frequency-domain channel estimates for the data subcarriers. The channel estimation device 214 is described in more detail below. The digital demodulator 216 demodulates the received modulation symbols in the data subcarriers using the frequency-domain channel estimates for the data subcarriers from the channel estimation device 214. The digital demodulator 216 compensates the signal attenuation and phase rotation for each subcarrier from the channel estimates. The demodulator output is hard or soft decision of encoded bits. The de-interleaver 218 de-interleaves the bit decisions. The channel decoder 220 decodes the de-interleaved bit decisions to extract the original information bits.

Although the components 102-116 of the OFDMA transmitter 100 and the components 204-220 of the OFDMA receiver 200 are illustrated and described herein as separate units, these components represent functional blocks, and consequently, may or may not be embodied in the form of physically separate units. Thus, some of these components may be combined into integrated modules. Alternatively, one or more of these components may be divided into two or more modules. Furthermore, these components may be implemented in any combination of hardware, firmware and/or software.

Figure 3:
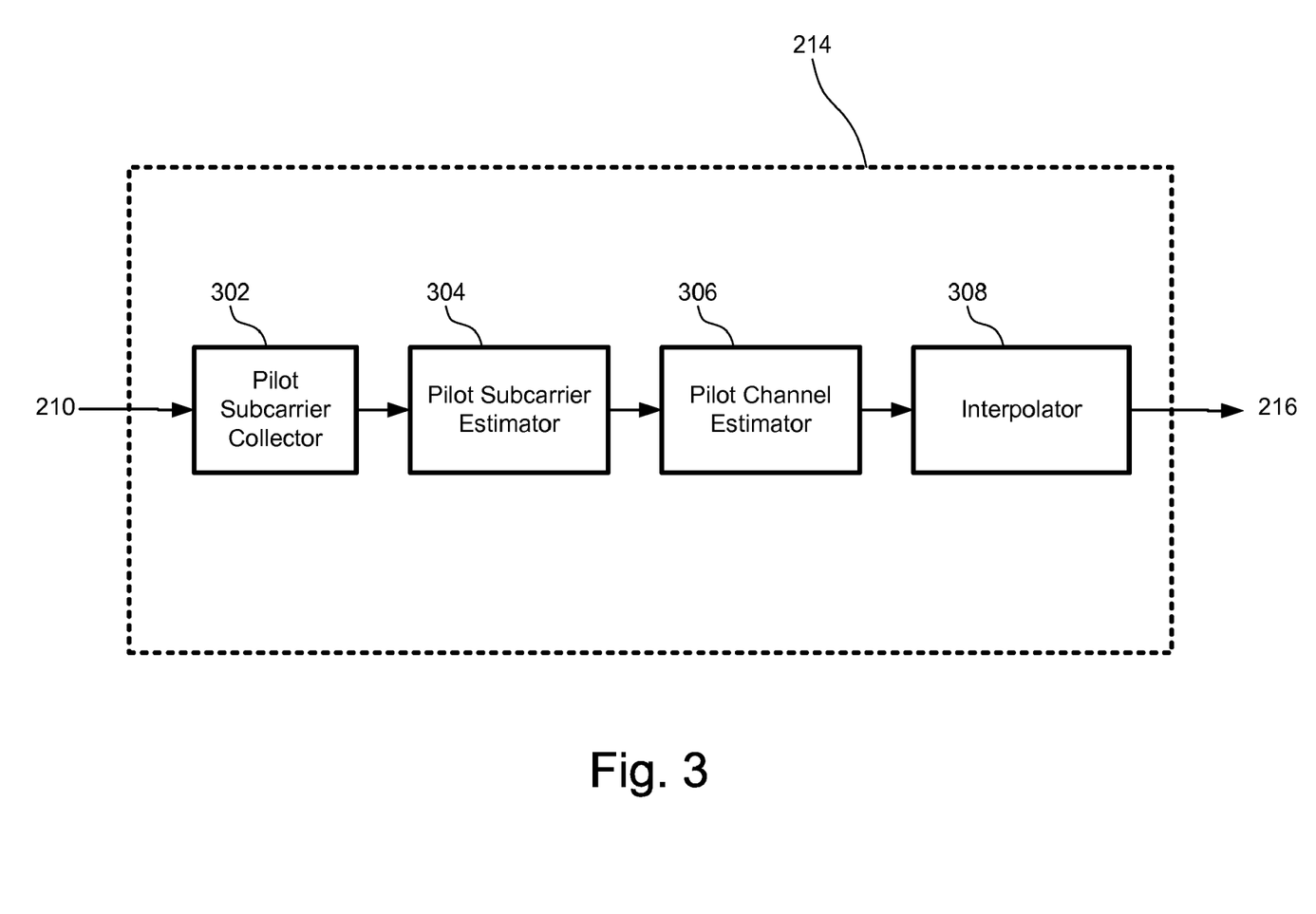
FIG. 3 is a block diagram of a channel estimation device in the OFDMA receiver of FIG. 2 in accordance with an embodiment of the invention.

The channel estimation device 214 is configured to provide robust channel estimation even when pilot subcarriers in incoming OFDMA signals are sparsely spaced across subcarriers. Thus, the channel estimation device 214 can support an OFDM-based wireless communication system using sparsely spaced pilot subcarriers.

As described above, the channel estimation device 214 operates on the output of the FFT unit 210. The output of the FFT unit 210 can be mathematically described as, $$y_{pilot,n}(m) = H_n(m) p_n(m) + z_n(m), \quad (1)$$

where $y_{pilot,n}(m)$, $p_n(m)$ $H_n(m)$ and $z_n(m)$ are described as follows:

n: subcarrier index (increasing over frequency);
m: OFDMA symbol index (increasing over time);
$y_{pilot,n}(m)$: received pilot subcarrier value of the n-th subcarrier for the m-th OFDMA symbol observed by the receiver;
$p_n(m)$: transmitted pilot subcarrier value of the n-th subcarrier for the m-th OFDMA symbol that is known both at the transmitter and at the receiver;
$H_n(m)$: channel response of the n-th subcarrier for the m-th OFDMA symbol to be estimated by the receiver; and
$z_n(m)$: random thermal noise and/or other interference at the receiver whose value is not known.

In order to estimate the channel response of the k-th subcarrier that carries the data symbol, the channel estimation device 214 is configured to combine the pilot subcarriers with the same subcarrier indexes at different OFDM symbols across time domain and then to interpolate the resulting pilot carriers in the frequency domain. The channel estimation device 214 operates to select appropriate pilot subcarriers in the time-domain, combine and interpolate the channel response of the data subcarrier. The channel estimation device 214 is configured to provide robust channel estimation in various time-varying environments without significant computational complexity and hardware requirements.

The channel estimation device 214 operates with respect to an interpolation window. In the time domain, an interpolation window is defined as a set of OFDM symbol indexes where the same channel estimate values are used. Let $T=\{m_1, m_2, \ldots, m_M\}$ denote this set, where M can be varied. In the frequency domain, the interpolation window is a set of pilot subcarrier location indexes in which frequency-domain interpolation is applied and the corresponding data subcarrier location indexes. Let $I=\{n_1, n_2, \ldots, n_K\}$ denote the set of pilot subcarrier location indexes in the interpolation window, where K can be varied, and $D=\{d_1, d_2, \ldots, d_L\}$ denote the set of corresponding subcarrier location indexes over which the interpolation is performed, where L can be varied.

As shown in FIG. 3, the channel estimation device 214 includes a pilot subcarrier collector 302, a pilot subcarrier estimator 304, a pilot channel estimator 306 and an interpolator 308. These components of the channel estimation device 214 operate to produce data channel estimate values with respect to an interpolation window.

The pilot subcarrier collector 302 is configured to collect pilot subcarriers corresponding to I over time, including the pilot subcarriers in a target interpolation window T. Thus, the pilot subcarrier collector 302 is configured to collect pilot subcarriers across multiple OFDM symbol indexes and across multiple subcarrier location indexes, which includes the target interpolation window.

The pilot subcarrier estimator 304 is configured to estimate "missing" pilot subcarriers in the target interpolation window using some of the pilot subcarriers outside of the target interpolation window. If a pilot subcarrier does not exist at a particular pilot subcarrier index in the target interpolation window, the pilot subcarrier estimator 304 uses one or more pilot subcarriers outside of the target interpolation window at the same pilot subcarrier location index to produce an estimated pilot subcarrier at that pilot subcarrier location index. These pilot subcarriers outside of the target interpolation window are pilot subcarriers located in past and future OFDM symbols with respect to the target interpolation window, i.e., pilot subcarriers located in earlier and later received OFDM symbols with respect to the target interpolation window. In particular, the pilot subcarriers outside of the target interpolation window at the pilot subcarrier location index where the pilot subcarrier is "missing" are combined to produce the estimated pilot subcarrier at that pilot subcarrier location index. In an embodiment, the pilot subcarrier estimator 304 applies one-tap Finite Infinite Response (FIR) filtering across different OFDM symbols on the pilot subcarriers at the same pilot subcarrier index as follows:

$$\tilde{y}_{pilot,n_k}(m) = \alpha y_{pilot,n_k}(m + \Delta_{1k}) + (1-\alpha) y_{pilot,n_k}(m - \Delta_{2k}), \quad (2)$$

where $\alpha$ is a weighting factor between 0 and 1 that determines the contribution of each pilot subcarrier to be combined, and $\Delta_{1k}$ and $\Delta_{2k}$ are appropriate OFDM symbol offsets where the pilot index $n_k$ is located. One possible value for weighting factor $\alpha$ is 0.5. The resulting pilot subcarriers in the interpolation window are represented by P.

In an embodiment, if a pilot subcarrier at the pilot subcarrier index in I exists in the OFDM symbols in the interpolation window, that pilot subcarrier may be combined with other pilot subcarriers at the same pilot subcarrier index in preceding and subsequent OFDM symbols using, for example, equation (2). In other embodiments, the pilot subcarrier at the pilot subcarrier index in I in the OFDM symbols in the interpolation window can be directly used without any modification.

The pilot channel estimator 306 is configured to compute pilot channel estimate values using the resulting pilot subcarriers in the interpolation window, which includes the estimated pilot subcarriers at the pilot subcarrier location indexes with the missing pilot subcarriers.

The interpolator 306 is configured to interpolate the computed pilot channel estimates to derive data channel estimates for the data subcarrier location indexes in D and OFDM symbol indexes in the interpolation window. The interpolator 306 may be configured to perform any appropriate interpolation process, such as interpolation process in accordance with one of the following interpolation schemes: least square, linear, cubic and polynomial interpolation schemes. In an embodiment, the interpolator 306 may perform a particular interpolation process based on a current channel condition estimate, such as a current channel profile estimate, which may be provided to the interpolator from one or more other components of the OFDMA receiver 200.

Figure 4:
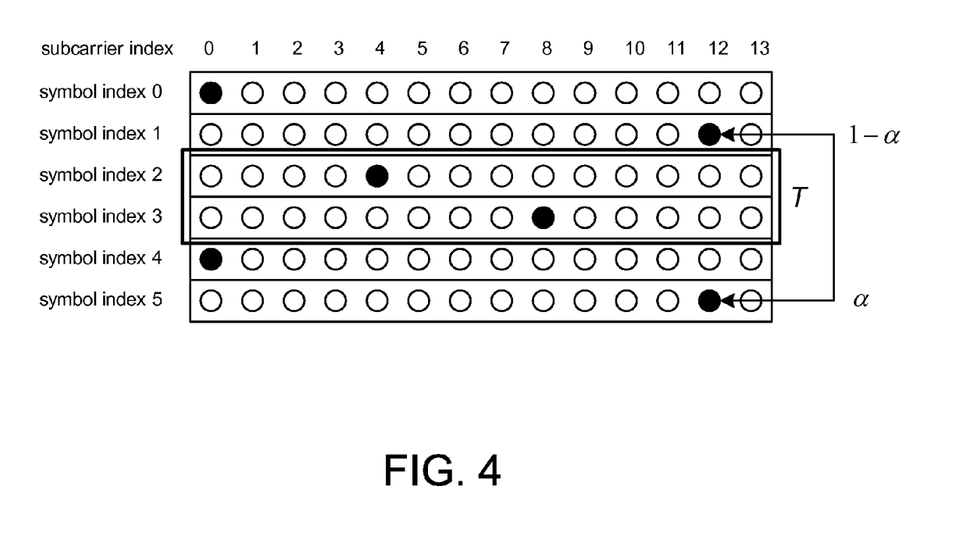
FIG. 4 is a grid map of subcarrier indexes in the frequency domain and OFDM symbol indexes in the time domain, showing pilot subcarriers in and outside of a target interpolation widow.

The operation of the channel estimation device 214 is described using an example represented by a grid map of FIG. 4, which shows data and pilot subcarriers of an OFDM signal with respect to different pilot and data subcarrier location indexes and different OFDM symbol indexes. In FIG. 4, the pilot subcarriers in the different OFDM symbols are represented by solid black circles, while the data subcarriers in the different OFDM symbols are represented by white circles. The pilot subcarriers are collected by the pilot subcarrier collector 302 of the channel estimation device 214. In this example, the target interpolation window T includes the OFDM symbol indexes 2 and 3, I={0, 4, 8, 12} and D={0, 1, 2, 3, 4, 5, 6, 7, 8, 9, 10, 11, 12, 13}. As shown in FIG. 4, there are only two sparsely spaced pilot subcarriers in the target interpolation window T, which are located at the pilot subcarrier location indexes 4 and 8. However, there are no pilot subcarriers in the target interpolation window T at the pilot subcarrier location indexes 0 and 12. Thus, at the pilot subcarrier location indexes 0 and 12, pilot subcarriers at these pilot subcarrier location indexes that are outside of the target interpolation window T are used. In particular, at the pilot subcarrier location index 0, the pilot subcarriers at the OFDM symbol indexes 0 and 4 are combined to produce an estimated pilot subcarrier at the pilot subcarrier location index 0 for the target interpolation window T. Similarly, at the pilot subcarrier location index 12, the pilot subcarriers at the OFDM symbol indexes 1 and 5 are combined to produce an estimated pilot subcarrier at the pilot subcarrier location index 12 for the target interpolation window T. The combining of these pilot subcarriers outside of the target interpolation window T is performed by the pilot subcarrier estimator 302 of the channel estimation device 214 using, for example, equation (2). The resulting pilot subcarriers for the target interpolation window T can be denoted as P={(1−α)$y_0$(0)+α$y_0$(4),$y_4$(2),$y_8$(3),(1−α)$y_{12}$(1)+α$y_{12}$(5)}. That is, the estimated pilot subcarriers at the pilot subcarrier location indexes 0 and 12 for the target interpolation window T and the pilot subcarriers at the pilot subcarrier location indexes 4 and 8 in the target interpolation window T are used as the pilot subcarriers for the target interpolation window T.

In an embodiment, the pilot subcarriers in the target interpolation window T may also be modified using pilot subcarriers at the same pilot subcarrier location indexes that are outside of the target interpolation window T. As an example, the pilot subcarrier at the OFDM symbol index 2 and the pilot subcarrier location index 4 may be combined with any pilot subcarriers at the pilot subcarrier location index 4 that are outside of the target interpolation window T. However, in the grid map of FIG. 4, there are no such pilot subcarriers.

Figure 5A:
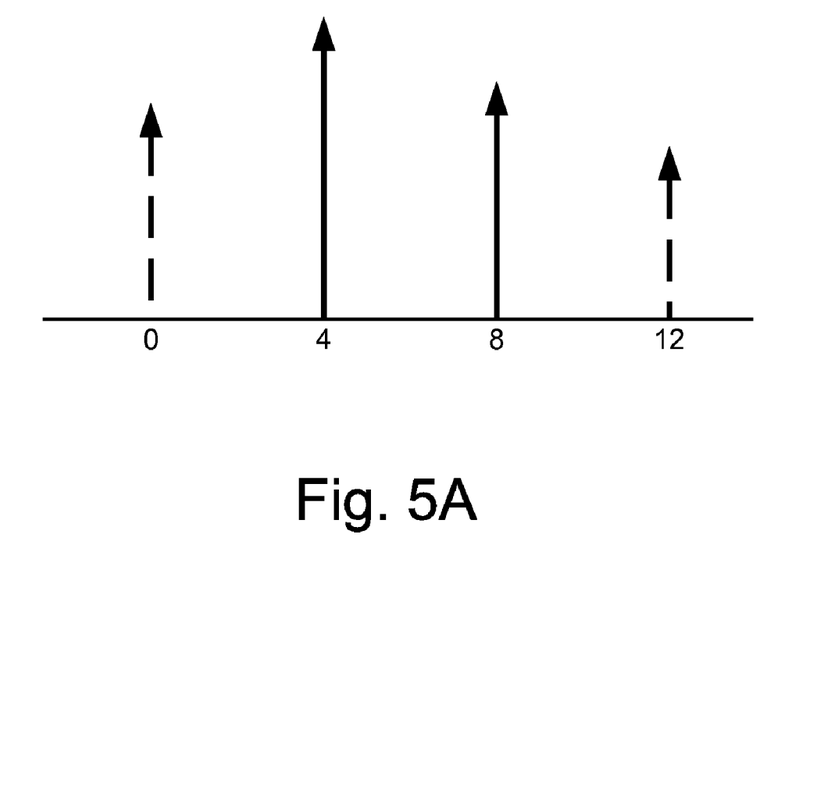
FIG. 5A illustrates estimated pilot channel values at the pilot subcarrier location indexes in the target interpolation window of FIG. 4, which includes estimated pilot channel values derived from estimated pilot subcarriers for the interpolation window in accordance with an embodiment of the invention.

The resulting pilot subcarriers for the target interpolation window T are then used by the pilot channel estimator 306 of the channel estimation device 214 to compute estimated pilot channel values, which represent channel response at the pilot subcarrier location indexes of the target interpolation window T. FIG. 5A illustrates the estimated pilot channel values at the pilot subcarrier location indexes 0, 4, 8 and 12 in the target interpolation window T, which includes estimated pilot channel values derived from estimated pilot subcarriers for the interpolation window T at the pilot subcarrier location indexes 0 and 12 and estimated pilot channel values derived from the pilot subcarriers in the interpolation window T at the pilot subcarrier location indexes 4 and 8.

Figure 5B:
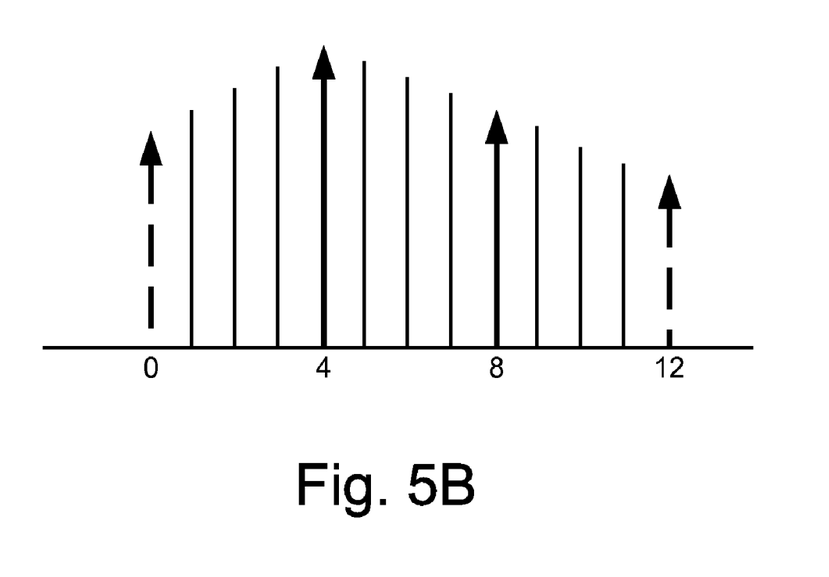
FIG. 5B illustrates estimated data channel values at the data subcarrier location indexes in the target interpolation window of FIG. 4, which have been interpolated from the estimated pilot channel values of FIG. 5A, in accordance with an embodiment of the invention.

The estimated pilot channel values are then interpolated by the interpolator 308 of the channel estimation device 214 using an interpolation scheme, such a least square interpolation scheme. FIG. 5B illustrates estimated data channel values at the data subcarrier location indexes 1, 2, 3, 5, 6, 7, 9, 10 and 11 in the target interpolation window T, which have been interpolated from the estimated pilot channel values at the pilot subcarrier location indexes 0, 4, 8 and 12.

Figure 6:
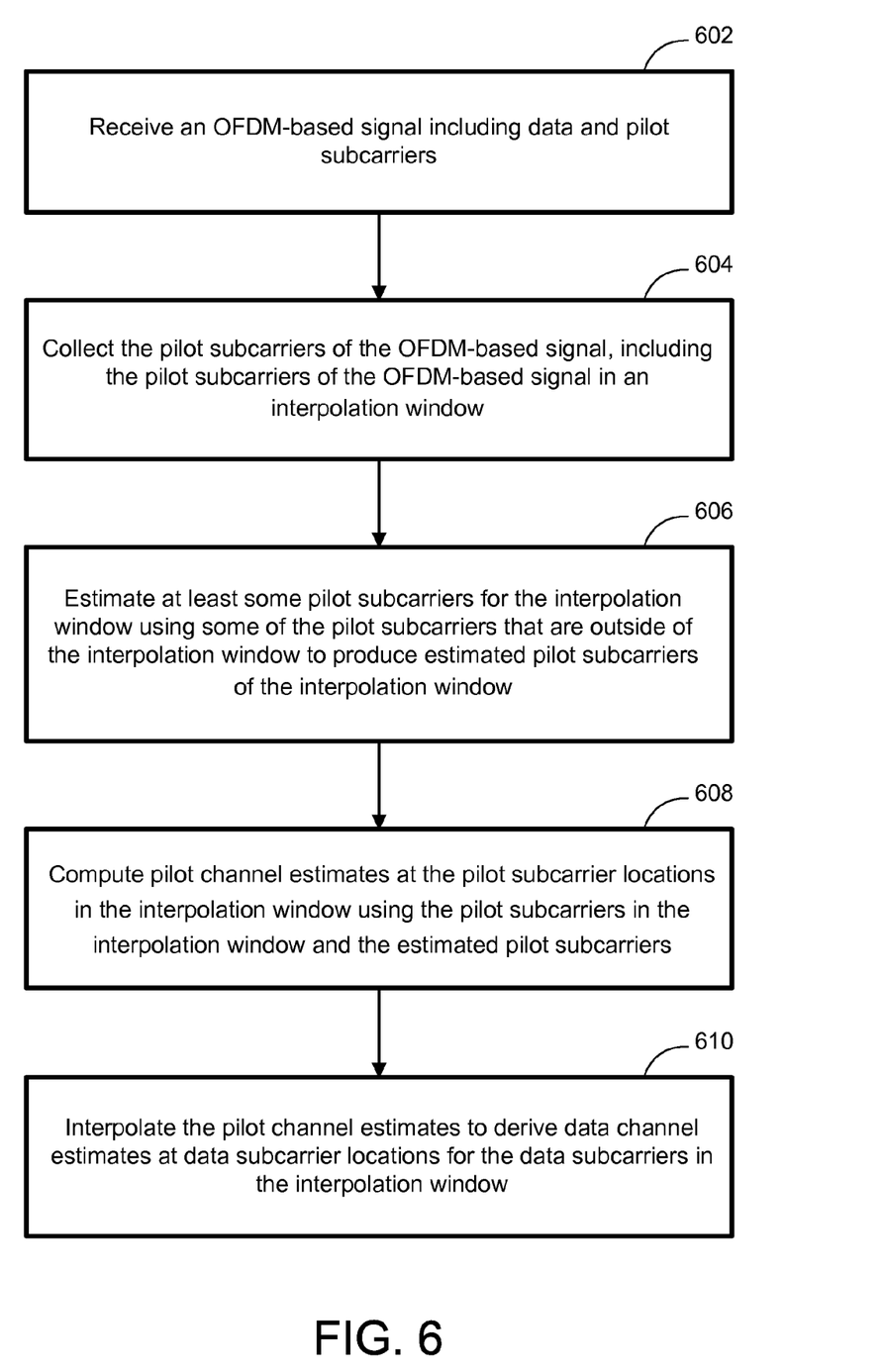
FIG. 6 is a process flow diagram of a method for performing a channel estimation for an OFDM-based wireless communication system using sparsely spaced pilot subcarriers in accordance with an embodiment of the invention.

A method for performing a channel estimation for an OFDM-based wireless communication system using sparsely spaced pilot subcarriers is described with reference to a process flow diagram of FIG. 6. At block 602, an OFDM-based signal including data and pilot subcarriers is received. At block 604, the pilot subcarriers of the OFDM-based signal, including the pilot subcarriers of the OFDM-based signal in an interpolation window, are collected. The interpolation window is defined as at least one OFDM-based symbol index in the time domain where same channel estimates will be used and a set of pilot and data subcarrier location indexes in the frequency domain. At block 606, at least some pilot subcarriers for the interpolation window is estimated using some of the pilot subcarriers that are outside of the interpolation window to produce estimated pilot subcarriers of the interpolation window. At block 608, pilot channel estimates at the pilot subcarrier locations in the interpolation window are computed using the pilot subcarriers in the interpolation window and the estimated pilot subcarriers. At block 610, the pilot channel estimates are interpolated to derive data channel estimates at data subcarrier locations for the data subcarriers in the interpolation window.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing a channel estimation for an OFDM-based wireless communication system using sparsely spaced pilot subcarriers, the method comprising:
  receiving an OFDM-based signal including data and pilot subcarriers;
  collecting the pilot subcarriers of the OFDM-based signal, including the pilot subcarriers of the OFDM-based signal in an interpolation window, the interpolation window being defined as at least one OFDM-based symbol index in the time domain where same channel estimates will be used and a set of pilot and data subcarrier location indexes in the frequency domain;
  estimating at least some pilot subcarriers for the interpolation window using some of the pilot subcarriers that are outside of the interpolation window to produce estimated pilot subcarriers of the interpolation window;

computing pilot channel estimates at the pilot subcarrier locations in the interpolation window using the pilot subcarriers in the interpolation window and the estimated pilot subcarriers; and interpolating the pilot channel estimates to derive data channel estimates at data subcarrier locations for the data subcarriers in the interpolation window, wherein the estimating includes combining multiple pilot subcarriers outside of the interpolation window to produce one of the estimated pilot subcarriers of the interpolation window, the multiple pilot subcarriers being located at a particular pilot subcarrier location, and wherein the combining includes applying a one-tap FIR filtering across the multiple OFDM-based symbol indexes on the pilot subcarriers of the particular pilot subcarrier location using:

$$\tilde{y}_{pilot,n_k}(m) = \alpha y_{pilot,n_k}(m+\Delta_{1k}) + (1-\alpha) y_{pilot,n_k}(m-\Delta_{2k}),$$

where $\alpha$ is a weighting factor between 0 and 1 that determines any contribution of each pilot subcarrier to be combined, and $\Delta_{1k}$ and $\Delta_{2k}$ are appropriate OFDM symbol offsets where the pilot index $n_k$ is located.

2. The method of claim 1 wherein $\alpha$ is set to a value of 0.5.

3. The method of claim 1 wherein the estimating includes combining at least one pilot subcarrier outside of the interpolation window and a pilot subcarrier within the interpolation window to produce one of the estimated pilot subcarriers of the interpolation window, the at least one pilot subcarrier and the pilot subcarrier being located at a particular pilot subcarrier location.

4. The method of claim 1 wherein the estimating includes estimating the at least some pilot subcarriers at the pilot subcarrier locations in the interpolation window using some of the pilot subcarriers at an OFDM-based symbol index that is directly adjacent to the interpolation window with respect to time.

5. The method of claim 1 wherein the interpolating includes interpolating the pilot channel estimates to derive the data channel estimates at the data subcarrier locations for the data subcarriers using the least square interpolation scheme.

6. A channel estimation device for an OFDM-based wireless communication system using sparsely spaced pilot subcarriers, the device comprising:

a pilot subcarrier collector configured to collect pilot subcarriers of the OFDM-based signal, including the pilot subcarriers of the OFDM-based signal in an interpolation window, the interpolation window being defined as at least one OFDM-based symbol index in the time domain where same channel estimates will be used and a set of pilot and data subcarrier location indexes in the frequency domain;

a pilot subcarrier estimator operably connected to the pilot subcarrier collector, the pilot subcarrier estimator being configured to estimate at least some pilot subcarriers for the interpolation window using some of the pilot subcarriers that are outside of the interpolation window to produce estimated pilot subcarriers of the interpolation window;

a pilot channel estimator operably connected to the pilot subcarrier estimator, the pilot channel estimator being configured to compute pilot channel estimates at the pilot subcarrier locations in the interpolation window using the pilot subcarriers in the interpolation window and the estimated pilot subcarriers; and an interpolator operably connected to the pilot channel estimator, the interpolator being configured to interpolate the pilot channel estimates to derive data channel estimates at data subcarrier locations for the data subcarriers in the interpolation window, wherein the pilot subcarrier estimator is configured to combine multiple pilot subcarriers outside of the interpolation window to produce one of the estimated pilot subcarriers of the interpolation window, the multiple pilot subcarriers being located at a particular pilot subcarrier location, and wherein the pilot subcarrier estimator is configured to apply a one-tap FIR filtering across the multiple OFDM-based symbol indexes on the pilot subcarriers of the particular pilot subcarrier location using:

$$\tilde{y}_{pilot,n_k}(m) = \alpha y_{pilot,n_k}(m+\Delta_{1k}) + (1-\alpha) y_{pilot,n_k}(m-\Delta_{2k}),$$

where $\alpha$ is a weighting factor between 0 and 1 that determines any contribution of each pilot subcarrier to be combined, and $\Delta_{1k}$ and $\Delta_{2k}$ are appropriate OFDM symbol offsets where the pilot index $n_k$ is located.

7. The device of claim 6 wherein $\alpha$ is set to a value of 0.5.

8. The device of claim 6 wherein the pilot subcarrier estimator is configured to combine at least one pilot subcarrier outside of the interpolation window and a pilot subcarrier within the interpolation window to produce one of the estimated pilot subcarriers of the interpolation window, the at least one pilot subcarrier and the pilot subcarrier being located at a particular pilot subcarrier location.

9. The device of claim 6 wherein the pilot subcarrier estimator is configured to estimate the at least some pilot subcarriers at the pilot subcarrier locations in the interpolation window using some of the pilot subcarriers at an OFDM-based symbol index that is directly adjacent to the interpolation window with respect to time.

10. The device of claim 6 wherein the interpolator is configured to interpolate the pilot channel estimates to derive the data channel estimates at the data subcarrier locations for the data subcarriers using the least square interpolation scheme.

11. A method for performing a channel estimation for an OFDM-based wireless communication system using sparsely spaced pilot subcarriers, the method comprising:

receiving an OFDM-based signal including data and pilot subcarriers;

collecting the pilot subcarriers of the OFDM-based signal across multiple subcarrier location indexes and across multiple OFDM-based symbol indexes, including the pilot subcarriers of the OFDM-based signal in an interpolation window, the interpolation window being defined as a set of OFDM-based symbol indexes in the time domain where same channel estimates will be used and a set of pilot and data subcarrier location indexes in the frequency domain;

estimating at least some missing pilot subcarriers at pilot subcarrier locations for the interpolation window using some of the pilot subcarriers at the pilot subcarrier locations that are outside of the interpolation window to produce estimated pilot subcarriers of the interpolation window;

computing pilot channel estimates at the pilot subcarrier locations in the interpolation window using the pilot subcarriers in the interpolation window and the estimated pilot subcarriers; and interpolating the pilot channel estimates to derive data channel estimates at data subcarrier locations for the data subcarriers in the interpolation window, wherein the estimating includes combining multiple pilot subcarriers outside of the interpolation window to produce one of the estimated pilot subcarriers of the interpolation window, the multiple pilot subcarriers being located at a particular pilot subcarrier location, and wherein the combining includes applying a one-tap FIR filtering across the multiple OFDM-based symbol indexes on the pilot subcarriers of the particular pilot subcarrier location using:

$$\tilde{y}_{pilot,n_k}(m) = \alpha y_{pilot,n_k}(m+\Delta_{1k}) + (1-\alpha) y_{pilot,n_k}(m-\Delta_{2k}),$$

where $\alpha$ is a weighting factor between 0 and 1 that determines any contribution of each pilot subcarrier to be combined, and $\Delta_{1k}$ and $\Delta_{2k}$ are appropriate OFDM symbol offsets where the pilot index $n_k$ is located.

12. The method of claim 11 wherein the estimating includes combining at least one pilot subcarrier outside of the interpolation window and a pilot subcarrier within the interpolation window to produce one of the estimated pilot subcarriers of the interpolation window, the at least one pilot subcarrier and the pilot subcarrier being located at a particular pilot subcarrier location.

13. The method of claim 11 wherein the estimating includes estimating the at least some missing pilot subcarriers at the pilot subcarrier locations in the interpolation window using some of the pilot subcarriers at an OFDM-based symbol index that is directly adjacent to the interpolation window with respect to time.

14. The method of claim 11 wherein the interpolating includes interpolating the pilot channel estimates to derive the data channel estimates at the data subcarrier locations for the data subcarriers using the least square interpolation scheme.

* * * * *